(12) United States Patent
Fujiwara

(10) Patent No.: US 8,757,562 B2
(45) Date of Patent: Jun. 24, 2014

(54) WIRE HARNESS CLIP AND METHOD OF MOUNTING WIRE HARNESS CLIP ONTO VEHICLE

(75) Inventor: Yoshiki Fujiwara, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 13/704,112

(22) PCT Filed: Mar. 28, 2011

(86) PCT No.: PCT/JP2011/057595
§ 371 (c)(1),
(2), (4) Date: Dec. 13, 2012

(87) PCT Pub. No.: WO2012/017706
PCT Pub. Date: Feb. 9, 2012

(65) Prior Publication Data
US 2013/0092803 A1  Apr. 18, 2013

(30) Foreign Application Priority Data
Aug. 5, 2010  (JP) .................................. 2010-176787

(51) Int. Cl.
| F16L 3/08 | (2006.01) |
| B60R 16/02 | (2006.01) |
| H02G 3/32 | (2006.01) |
| B65D 63/10 | (2006.01) |
| F16B 2/22 | (2006.01) |
| F16B 2/24 | (2006.01) |
| F16B 5/12 | (2006.01) |

(52) U.S. Cl.
CPC ......... *B60R 16/0215* (2013.01); *B60R 16/0207* (2013.01); *H02G 3/32* (2013.01); *B65D 63/1063* (2013.01); *F16B 2/22* (2013.01); *F16B 2/24* (2013.01); *F16B 5/121* (2013.01)
USPC ..... 248/74.2; 248/74.3; 248/316.7; 24/16 PB

(58) Field of Classification Search
CPC ........... B60R 16/0215; B60R 16/0207; B65D 63/1063; F16L 3/1075; F16L 3/00; F16L 3/233; F16L 33/02; F16B 2/22; F16B 2/24; F16B 5/121; H02G 3/32
USPC .......... 248/74.1, 74.2, 74.3, 316.7; 24/16 PB, 24/316, 16 R, 20 R
See application file for complete search history.

(56) References Cited

U.S. PATENT DOCUMENTS

| 2008/0229550 A1* | 9/2008 | Elsner ......................... 24/16 PB |
| 2008/0244874 A1* | 10/2008 | Chiorboli .................... 24/16 PB |

(Continued)

FOREIGN PATENT DOCUMENTS

| JP | 34-10664 | 7/1959 |
| JP | 7-099719 | 4/1995 |
| JP | 10-331814 | 12/1998 |
| JP | 2000-152467 | 5/2000 |

(Continued)

OTHER PUBLICATIONS

WIPO International Search Report dated Jun. 7, 2011 with English language translation.

*Primary Examiner* — Todd M Epps
(74) *Attorney, Agent, or Firm* — Greenblum & Bernstein P.L.C.

(57) ABSTRACT

The present invention includes a C-type resin clip projecting from an exterior surface on a band tightener in a band-type wire harness mount or from a front surface on a middle portion of a substrate in a substrate-type wire harness mount, and a C-type metal clip having a length shorter than the C-type resin clip. The C-type metal clip is mounted between upper and lower tabs of the C-type resin clip. A pressing projection is provided on opposing interior surfaces of each of the upper and lower tabs of the C-type resin clip, and a press-down tab is provided on the upper and lower tabs of the C-type metal clip. When a bracket is pressed in between the upper and lower tabs of the C-type metal clip, the press-down tabs are lifted by the pressing projections and both the upper and lower surfaces of the bracket are pinched and held.

4 Claims, 4 Drawing Sheets

(56) References Cited

U.S. PATENT DOCUMENTS

2009/0236486 A1* 9/2009 Matsuno et al. .......... 248/316.7
2010/0236030 A1* 9/2010 Dyer .......................... 24/16 PB
2013/0067695 A1* 3/2013 Giotto et al. ............... 24/16 PB

FOREIGN PATENT DOCUMENTS

| JP | 2008/259363 | 10/2008 |
| JP | 2009-225616 | 10/2009 |

\* cited by examiner

WIRE HARNESS CLIP AND METHOD OF MOUNTING WIRE HARNESS CLIP ONTO VEHICLE

FIELD OF THE INVENTION

The present invention relates to a wire harness clip and a method of mounting the wire harness clip onto a vehicle. More specifically, the present invention mounts the wire harness clip in an appropriate position on a bracket on a vehicle body.

BACKGROUND OF THE INVENTION

A clip 1 has been suggested as a wire harness clip to be mounted on a bracket made of metal or resin on a vehicle body, the clip 1 including, as shown in FIG. 6, a C-type resin clip 3 mounted on a bracket 6 by pinching and a wire harness mount 2 connected to the resin clip 3 and mounted on a wire harness (not shown in the drawing) (see Japanese Patent Laid-open Publication No. H7-99719 [Patent Literature 1]).

A C-type metal clip 4 is mounted on an interior surface of the resin clip 3, the metal clip 4 having the same shape as the interior surface of the resin clip 3. Claws 5 are raised from upper and lower tabs 4c and 4a, which are on either side of a curved portion 4b of the metal clip 4, the claws 5 raised into a hollow space on the metal clip 4. Accordingly, when the bracket 6 is pressed in between the upper and lower tabs 4c and 4a of the metal clip 4, the claws 5 are configured to pinch and hold both of an upper and lower surface of the bracket 6, thus anchoring the clip 1 to the bracket 6.

RELATED ART

Patent Literature

Patent Literature 1: Japanese Patent Laid-open Publication No. H7-99719

SUMMARY OF THE INVENTION

Problems to be Solved by the Invention

Meanwhile, the wire harness clip 1 must be mounted in an appropriate position on the bracket 6 in consideration of a mounting position for the wire harness and another bracket, a connecting position for a connector, and the like. However, with the clip 1 having the above-described configuration, once the bracket 6 is pressed inside the metal clip 4, both of the upper and lower surfaces of the bracket 6 are pinched and held by the claws 5 and the clip 1 is anchored to the bracket 6. Therefore, there is an issue that in a case where the mounting position was not appropriate, the mounting position is difficult to change.

The present invention has as its subject to enable, with a single mounting operation, a wire harness clip to be reliably anchored to an appropriate mounting position on a bracket made of metal or resin on a vehicle body.

Means for Solving the Problems

In order to solve the above-identified issue, a first aspect of the invention provides a wire harness clip that includes a band-type wire harness mount or a substrate-type wire harness mount; a C-type resin clip; and a C-type metal clip which has a length shorter than the C-type resin clip. The band-type wire harness mount is anchored by winding a band around a wire harness. The substrate-type wire harness mount is attached to the wire harness by wrapping an adhesive tape. The C-type resin clip is configured from a lower tab and an upper tab. The lower tab projects from an exterior surface on a band tightener in the band-type wire harness mount or from a front surface on a middle portion of a substrate in the substrate-type wire harness mount. The upper tab is continuous via a curved portion formed on one end of the lower tab. The C-type metal clip is mounted to an opening side of a hollow space between the upper and lower tabs of the C-type resin clip so as to retreat freely. A pressing projection is provided on opposing interior surfaces of each of the upper and lower tabs of the C-type resin clip, and a press-down tab is provided surrounded by a U-shaped slit on the upper and lower tabs of the C-type metal clip. When a flat plate-shaped bracket is pressed in between the upper and lower tabs of the C-type metal clip, forcing the C-type metal clip to retreat, the press-down tabs are lifted by the pressing projections and both the upper and lower surfaces of the bracket are pinched and held.

As described above, in the wire harness clip of the present invention, the C-type metal clip, which has a length shorter than the C-type resin clip, is mounted to the opening side of the hollow space between the upper and lower tabs on the C-type resin clip so as to retreat freely. In addition, the press-down tabs provided on the C-type metal clip are configured such that when the C-type metal clip is forced to retreat, the press-down tabs are lifted by the pressing projections on the C-type resin clip. Accordingly, when the wire harness clip is mounted to the bracket made of metal or resin on the vehicle body, the bracket is pressed in between the upper and lower tabs of the C-type metal clip without forcing the C-type metal clip to retreat within the C-type resin clip. The wire harness clip can thus first be provisionally held on the bracket in a laterally displaceable state. Accordingly, final adjustment of the mounting position can be made at this stage. In addition, simply by forcing the C-type metal clip to retreat after final adjustment of the mounting position, both the upper and lower surfaces of the bracket can be pinched and held by the press-down tabs, which have been lifted by the pressing projections. Accordingly, the wire harness clip can be reliably anchored in a single mounting operation to the appropriate mounting position on the bracket, to which final adjustments have been made.

In addition, according to the present invention, a press-down angle of the press-down tabs can be changed depending on a degree of retreat of the C-type metal clip, and thus leeway can also be given for a thickness of a mountable bracket. Specifically, even when there is a slight difference in the thickness of the bracket, the thickness can be accommodated by the same wire harness clip, thus achieving universality for the clip.

In the C-type resin clip and the C-type metal clip, a distance between the opposing upper and lower tabs preferably decreases gradually from the opening side toward the curved portion side. In a state where the C-type metal clip is positioned on the opening side of the C-type resin clip, the C-type metal clip preferably has sufficient clearance to enable provisional pinching and holding of the bracket which has been pressed in between the upper and lower tabs. In addition, the press-down tabs are preferably lifted toward a retreating direction of the C-type metal clip. Accordingly, the U-shaped slits surrounding the press-down tabs preferably have a curved portion of a "U" positioned on the curved portion side (interior) of the C-type metal clip and a pair of end portions of the "U" positioned on the opening side (forward side) of the C-type metal clip. Moreover, the pressing projections of the C-type resin clip are preferably provided in a position enabling the press-down tabs to press down when the C-type metal clip is forced to retreat. The pressing projections preferably have a semi-conical shape in which a height of the pressing projection increases gradually toward the curved portion side (interior) of the C-type resin clip.

Latching projections projecting in opposing directions are preferably provided to a forefront on the opening side of the upper and lower tabs of the C-type resin clip. Before pressing the bracket in, the forefronts of the upper and lower tabs of the C-type metal clip preferably project toward and contact the latching projections.

By configuring the forefronts of the upper and lower tabs of the C-type metal clip before pressing in to project toward and contact the latching projections on the forefronts of the opening side of the upper and lower tabs of the C-type resin clip as described above, the C-type metal clip can be prevented from dropping toward the opening direction (forward direction).

In addition, engagement grooves are preferably provided along an interior surface of a first lateral edge of the upper and lower tabs on the C-type resin clip. First lateral edges of the C-type metal clip are inserted and mounted into the engagement grooves. Meanwhile, a stopper tab contacting a second lateral edge of the upper tab of the C-type metal clip after mounting is preferably provided on a second lateral edge of the upper tab of the C-type resin clip.

As described above, the first lateral edges of the C-type metal clip are inserted into the engagement grooves provided on the interior surface of the first lateral edges of the upper and lower tabs on the C-type resin clip, then the C-type metal clip is mounted to the C-type resin clip. Thereby, the C-type metal clip can be prevented from dropping to the first lateral edge side. In addition, after mounting the C-type metal clip, the stopper tab provided to the second lateral edge of the upper tab of the C-type resin clip contacts the second lateral edge of the upper tab of the C-type metal clip. Thereby, the C-type metal clip can also be prevented from dropping to the second lateral edge side. The stopper tab may also be provided to the second lateral edge of the lower tab of the C-type resin clip rather than to the upper tab, and may also be provided to the second lateral edges of both the upper and lower tabs of the C-type resin clip. However, for ease of formation of the stopper tab and ease of mounting the C-type metal clip in the C-type resin clip, providing the stopper tab to the second lateral edge of the upper tab of the C-type resin clip is preferred.

The C-type metal clip is preferably formed from an iron, a stainless steel, or an aluminum metal. Forming the C-type metal clip from an iron metal is particularly preferred. In addition, the C-type resin clip and the band-type or substrate-type wire harness mount are preferably integrally molded with a resin.

In addition, a second aspect of the invention provides a method of mounting a wire harness clip onto a vehicle body. The wire harness clip of the first aspect of the invention is mounted to the wire harness, then while routing the wire harness into the vehicle, the bracket is pressed in between the upper and lower tabs of the C-type metal clip, where the bracket is provisionally held. Final adjustments of the mounting position are then made by laterally displacing the clip with respect to the bracket while in the provisionally held state. In the final mounting position, the C-type resin clip is advanced toward the bracket such that the bracket forces the C-type metal clip to retreat within the C-type resin clip, thus fully anchoring the C-type resin clip.

Effect of the Invention

As described above, in the wire harness clip of the present invention, a C-type metal clip having a length shorter than a C-type resin clip is mounted to an opening side of a hollow space between upper and lower tabs of the C-type resin clip so as to retreat freely. In addition, press-down tabs provided on the C-type metal clip are configured to be lifted by pressing projections on the C-type resin clip when the C-type metal clip is forced to retreat. Accordingly, when the wire harness is mounted to the wire harness clip and the wire harness is routed in a vehicle, a bracket is pressed in between the upper and lower tabs of the C-type metal clip without forcing the C-type metal clip to retreat within the C-type resin clip. The wire harness clip can thus be provisionally held on the bracket in a laterally displaceable state. Accordingly, final adjustments of a mounting position can be made by displacing the wire harness clip in a lateral direction with respect to the bracket while in the provisionally held state. In addition, after final adjustments are made to the mounting position, the C-type resin clip is advanced toward the bracket so as to force the C-type metal clip to retreat. Thereby, both the upper and lower surfaces of the bracket can be pinched and held by the press-down tabs, which are lifted by the pressing projections. Thus, the wire harness clip can be fully and reliably anchored in a single mounting operation to an appropriate mounting position on the bracket, to which final adjustments have been made.

MODE FOR CARRYING OUT THE INVENTION

Figure 1A:
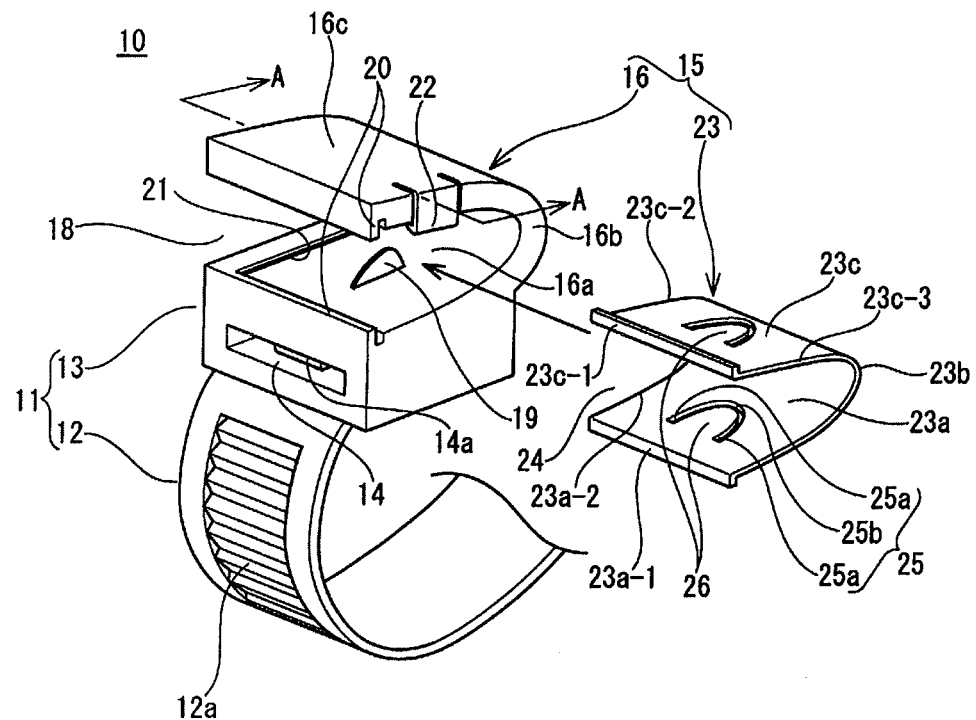
FIG. 1 illustrates a wire harness clip according to the present embodiment, (A) being an exploded perspective view and (B) being a cross-sectional view along a line A-A of the wire harness clip in which a C-type metal clip is mounted in a C-type resin clip.

Hereafter, an embodiment of a wire harness clip in the present invention is described with reference to the drawings. FIGS. 1 to 4 illustrate the present embodiment. As shown in FIG. 2, a wire harness clip 10 according to the present embodiment is configured from a band-type wire harness mount 11 and a clip 15, the band-type wire harness mount 11 anchored by winding around an outer circumference of a wire harness W/H, and the clip 15 mounted to a flat plate-shaped bracket 30 made of metal or resin on a vehicle body side. The band-type wire harness mount 11 is configured from a band 12 which wraps around the outer circumference of the wire harness W/H and a band tightener 13 which tightens and anchors the band 12. The band 12 projects from a position near a lower edge on a first lateral surface of the band tightener 13. The band tightener 13 includes a band latching hole 14 through which the band 12 wrapped around the wire harness W/H is passed from a second lateral surface of the band tightener 13 to the first lateral surface and latched. The band tightener 13 is configured to tighten and anchor the wire harness W/H with the band 12 by causing a latching claw 14a provided to an interior surface of the band latching hole 14 to latch to a saw-tooth-shaped latched groove 12a on a front surface of the band 12.

Figure 1B:
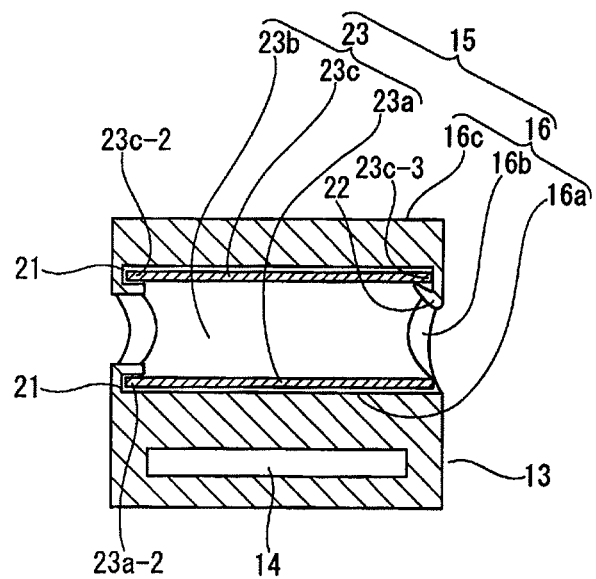
Figure 2:
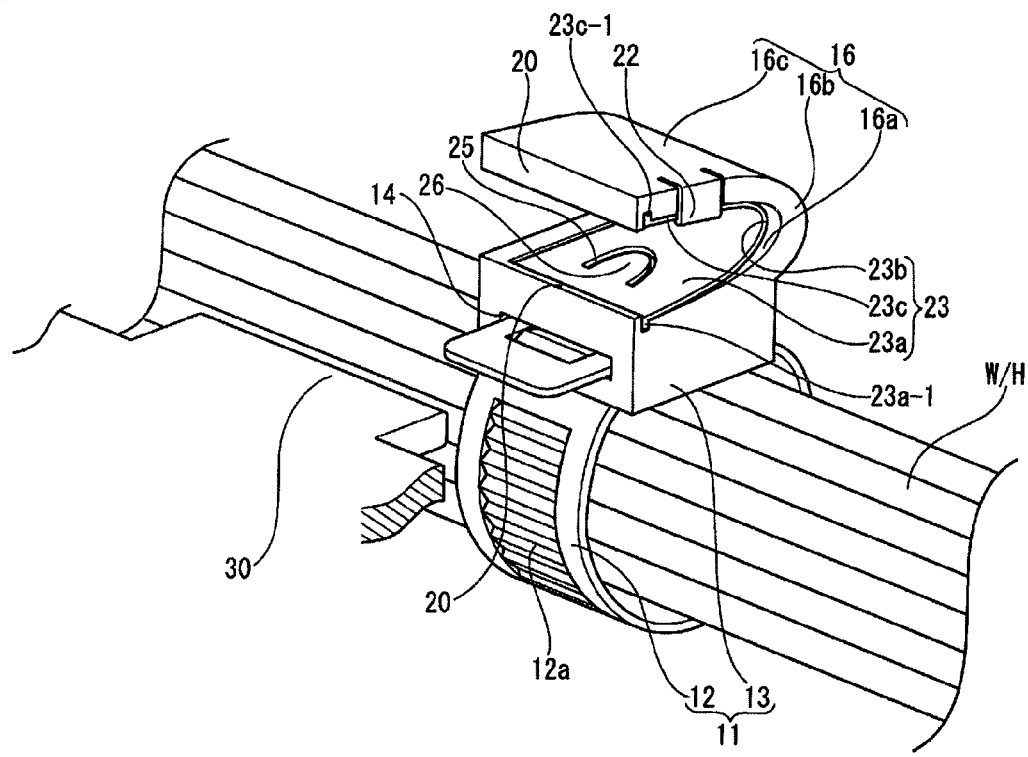
FIG. 2 is a schematic perspective view illustrating a state immediately before the wire harness clip mounted to a wire harness is mounted to a bracket.

Meanwhile, as shown in FIG. 1, the clip 15 is configured from a C-type resin clip 16 and a C-type metal clip 23 (made of an iron metal) having a length shorter than the C-type resin clip 16. The C-type resin clip 16 is configured from a lower tab 16a projecting on an upper surface of the band tightener 13 and an upper tab 16c continuous via a curved portion 16b formed on one end of the lower tab 16a. In the present embodiment, the C-type resin clip 16 and the band-type wire harness mount 11 are integrally molded with a resin. The C-type metal clip 23 also includes a lower tab 23a, a curved portion 23b, and an upper tab 23c. The C-type metal clip 23 is mounted to an opening 18 side of a hollow space between the upper and lower tabs 16c and 16a of the C-type resin clip 16 so as to retreat freely.

In the C-type resin clip 16 and the C-type metal clip 23, a distance between opposing upper and lower tabs decreases gradually from opening 18 and 24 sides toward the curved portions 16b and 23b. In a state where the C-type metal clip 23 is positioned on the opening 18 side of the C-type resin clip 16, the C-type metal clip 23 has sufficient clearance to enable provisional holding of the bracket 30 which has been pressed in between the upper and lower tabs 23c and 23a.

In addition, and press-down tabs 26 are provided surrounded by U-shaped slits 25 in opposing positions on the upper and lower tabs 23c and 23a of the C-type metal clip 23. The U-shaped slits 25 have a curved portion 25b of a "U" positioned on the curved portion 23b side of the C-type metal clip 23 and a pair of end portions 25a of the "U" positioned on the opening 24 side of the C-type metal clip 23. The press-down tabs 26 are lifted toward a retreating direction of the C-type metal clip 23.

Moreover, a pressing projection 19 is provided on opposing interior surfaces of the upper and lower tabs 16c and 16a of the C-type resin clip 16. The pressing projection 19 lifts the press-down tab 26 toward the hollow space when the C-type metal clip 23 is forced to retreat. The pressing projection 19 is provided at a position enabling a pressing force to be applied to the press-down tab 26 when the C-type metal clip 23 is forced to retreat. The pressing projection 19 has a semiconical shape in which the height increases gradually toward the curved portion 16b of the C-type resin clip 16.

Latching projections 20 project in opposing directions on a forefront on the opening side of the upper and lower tabs 16c and 16a of the C-type resin clip 16. Before pressing the bracket 30 in, forefronts 23c-1 and 23a-1 of the upper and lower tabs 23c and 23a of the C-type metal clip 23 project and contact the latching projections 20. Thereby, the C-type metal clip 23 is prevented from dropping in the opening direction. Moreover, engagement grooves 21 are provided on a first lateral edge on each of the upper and lower tabs 16c and 16a of the C-type resin clip 16. First lateral edges 23c-2 and 23a-2 of the upper and lower tabs 23c and 23a of the C-type metal clip 23 are inserted and mounted into the engagement grooves 21, the C-type metal clip 23 being inserted from a second lateral edge side into the hollow space of the C-type resin clip 16. In addition, a stopper tab 22 is provided on the second lateral edge of the upper tab 16c of the C-type resin clip 16 and contacts a second lateral edge 23c-3 of the upper tab 23c of the C-type metal clip 23 after mounting of the C-type metal clip 23. By employing the above-described configuration, the C-type metal clip 23 is prevented from dropping in a lateral direction.

Figure 3:
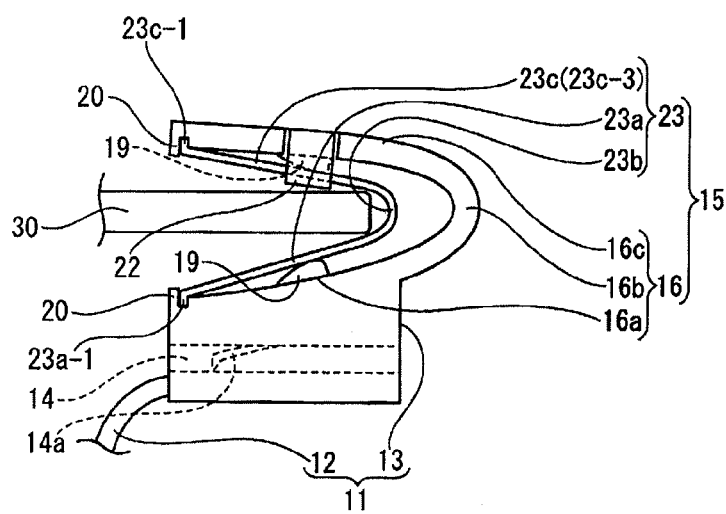
FIG. 3 is a schematic lateral view illustrating a state in which the bracket is pressed in between upper and lower tabs of the C-type metal clip, where the bracket is provisionally held.

Hereafter, a method of mounting the wire harness clip 10 to the bracket 30 in the present embodiment is described. First, the band 12 of the wire harness clip 10 is wrapped around and anchored to the outer circumference of the wire harness W/H. The C-type metal clip 23 is mounted to an opening side of the C-type resin clip 16 as described above. While routing the wire harness W/H into the vehicle, without forcing the C-type metal clip 23 to retreat, the bracket 30 is pressed in between the upper and lower tabs 23c and 23a of the C-type metal clip 23 from the opening 24 (18) side, where the bracket is provisionally held (FIG. 3). At this stage, the press-down tab 26 of the C-type metal clip 23 has not reached the pressing projection 19 of the C-type resin clip 16. Therefore, the press-down tab 26 is not lifted. Final adjustments of the mounting position are made by laterally displacing the wire harness clip 10 with respect to the bracket 30 while in the provisionally held state.

Figure 4A:
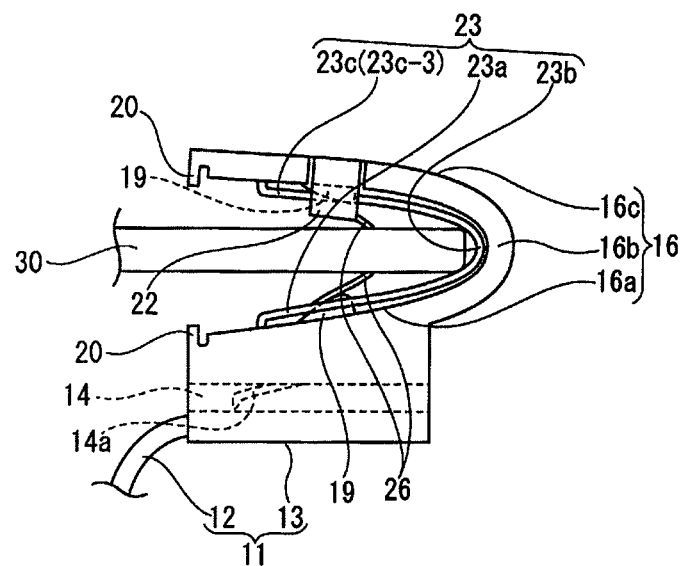
FIG. 4 illustrates a state in which the wire harness clip is fully anchored to the bracket, (A) being a schematic lateral view and (B) being a schematic cross-sectional view illustrating a press-down tab lifted by a pressing projection.
Figure 4B:
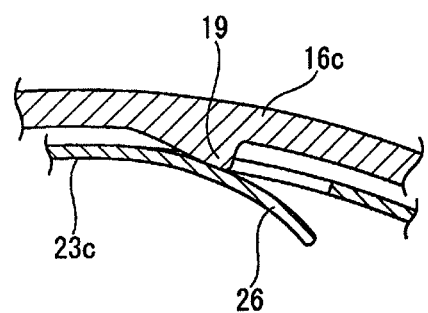

After final adjustments are made to the mounting position, the C-type resin clip 16 is advanced toward the bracket 30 so as to force the C-type metal clip 23 to retreat. Thereby, the press-down tabs 26 of the C-type metal clip 23 and the pressing projections 19 of the C-type resin clip 16 make contact and both the upper and lower surfaces of the bracket 30 are pinched and held by the press-down tabs 26 (FIG. 4(A)), which are lifted toward the hollow space by the pressing projections 19, as shown in FIG. 4(B). Accordingly, the wire harness clip 10 can be fully and reliably anchored in a single mounting operation to the appropriate mounting position on the bracket 30, to which final adjustments have been made.

Figure 5:
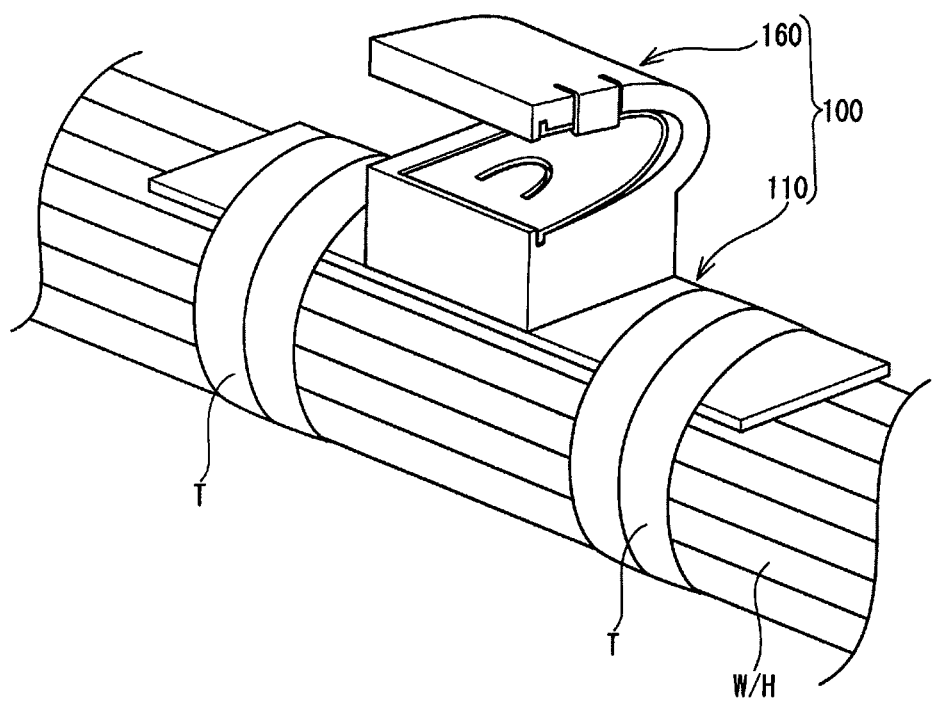
FIG. 5 is a schematic perspective view illustrating a different example of a wire harness clip in the present invention.
Figure 6:
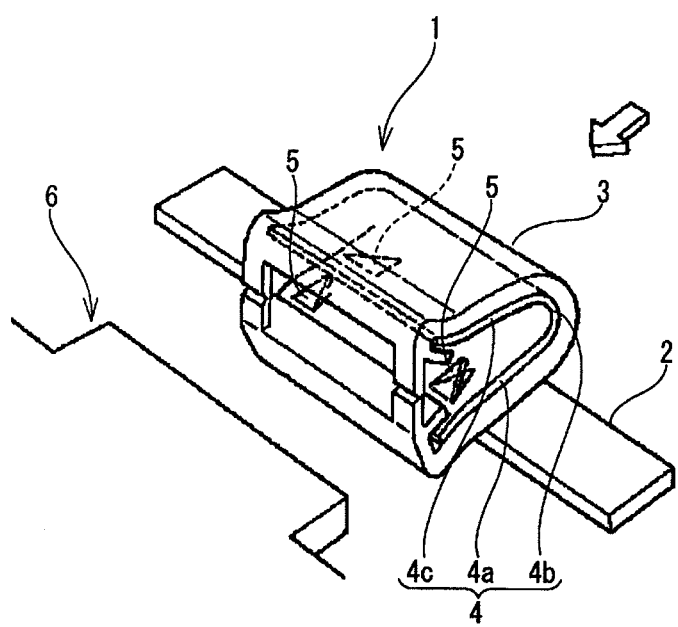
FIG. 6 is a drawing illustrating a conventional example.

Moreover, the wire harness clip of the present invention is not limited to the wire harness clip 10 which includes the band-type wire harness mount 11 in which the band 12 wraps around and anchors the wire harness W/H, as in the present embodiment. As shown in FIG. 5, a wire harness clip 100 may also be used that includes a substrate-type wire harness mount 110 which is attached to the wire harness W/H by wrapping an adhesive tape T. In the wire harness clip 100, a C-type resin clip 160 projects from a front surface on a middle portion of the substrate-type wire harness mount 110.

DESCRIPTION OF REFERENCE NUMERALS 10, 100 wire harness clip
11 band-type wire harness mount
12 band
13 band tightener
16 C-type resin clip
16a lower tab
16b curved portion
16c upper tab
18 opening
19 pressing projection
20 latching projection
21 engagement groove
22 stopper tab
23 C-type metal clip
23a lower tab
23b curved portion
23c upper tab
24 opening
25 U-shaped slit
26 press-down tab
30 bracket
110 substrate-type wire harness mount

The invention claimed is:

1. A wire harness clip comprising:
   one of a band-type wire harness mount anchored by winding a band around a wire harness and a substrate-type wire harness mount attached to a wire harness by wrapping an adhesive tape;
   a C-type resin clip comprising a lower tab and an upper tab continuous via a curved portion formed on one end of the lower tab, the lower tab projecting either from an exterior surface on a band tightener in the band-type wire harness mount, or from a front surface on a middle portion of a substrate in the substrate-type wire harness mount; and
   a C-type metal clip having a length shorter than the C-type resin clip, the C-type metal clip comprising a lower tab and an upper tab, wherein
   the C-type metal clip is mounted to an opening side of a hollow space between the upper and lower tabs of the C-type resin clip so as to retreat freely,
   a pressing projection is provided on opposing interior surfaces of each of the upper and lower tabs of the C-type resin clip, and a press-down tab surrounded by a U-shaped slit is provided on the upper and lower tabs of the C-type metal clip, and
   when a flat plate-shaped bracket is pressed between the upper and lower tabs of the C-type metal clip, forcing the C-type metal clip to retreat, the press-down tabs are lifted by the pressing projections and both upper and lower surfaces of the bracket are pinched and held.

2. The wire harness clip according to claim 1, wherein latching projections projecting in opposing directions are provided to a forefront on the opening side of the upper and lower tabs of the C-type resin clip, and forefronts of the upper and lower tabs of the C-type metal clip project toward and contact the latching projections prior to being pressed and forced to retreat.

3. The wire harness clip according to claim 1, wherein
   engagement grooves are provided along an interior surface of a first lateral edge of the upper and lower tabs on the C-type resin clip, and
   first lateral edges of the C-type metal clip are inserted and mounted into the engagement grooves while a stopper tab contacting a second lateral edge of the upper tab of the C-type metal clip after mounting is provided on a second lateral edge of the upper tab of the C-type resin clip.

4. A method of mounting a wire harness clip onto a vehicle body comprising:
   mounting the wire harness clip according to claim 1 to a wire harness;
   while routing the wire harness into the vehicle, pressing a bracket between upper and lower tabs of a C-type metal clip, where the bracket is provisionally held;
   making final adjustments of a mounting position by laterally displacing the C-type metal clip with respect to the bracket while in a provisionally held state; and
   while in a final mounting position, advancing a C-type resin clip toward the bracket such that the bracket forces the C-type metal clip to retreat within the C-type resin clip to fully anchor the C-type resin clip.

* * * * *